(No Model.)
J. A. MAXWELL.
FERTILIZER DISTRIBUTER.
No. 351,189. Patented Oct. 19, 1886.
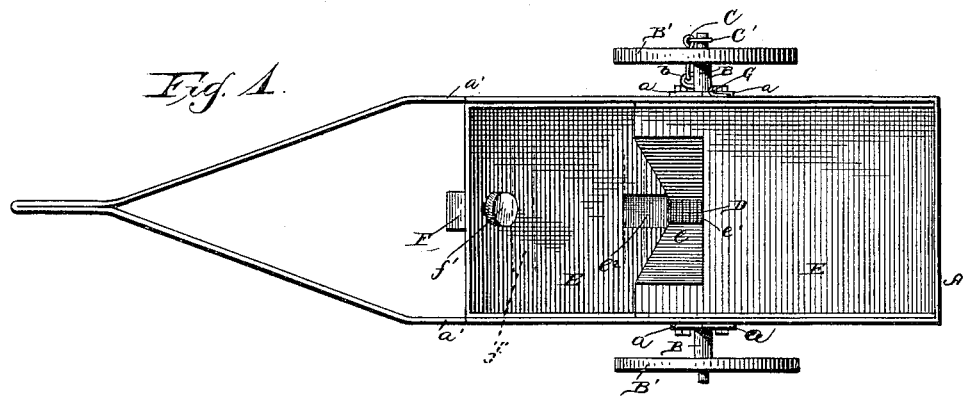
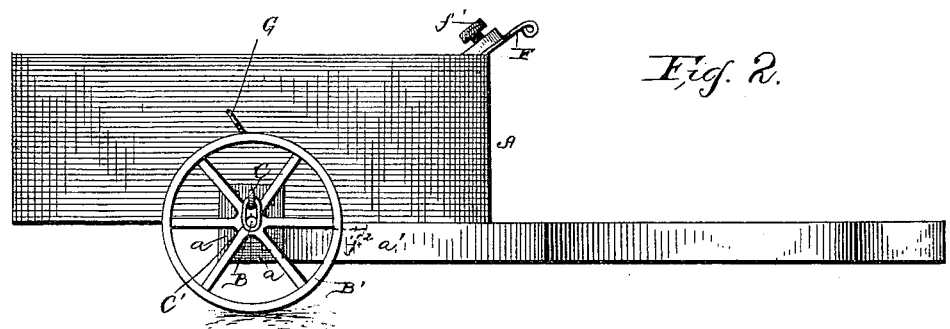
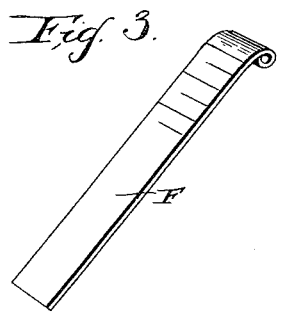
Witnesses:
John Enders Jr
Theod. M Still
Inventor:
John A. Maxwell
By Myers & Co.
Attorneys

United States Patent Office.

JOHN A. MAXWELL, OF CALVARY, GEORGIA.

FERTILIZER-DISTRIBUTER.

SPECIFICATION forming part of Letters Patent No. 351,189, dated October 19, 1886.

Application filed July 19, 1886. Serial No. 208,417. (No model.)

*To all whom it may concern:*

Be it known that I, JOHN A. MAXWELL, a citizen of the United States of America, residing at Calvary, in the county of Decatur and State of Georgia, have invented certain new and useful Improvements in Fertilizer-Distributers, of which the following is a specification, reference being had therein to the accompanying drawings.

This invention pertains to certain new and useful improvements in fertilizer-distributers, having for its object to provide means for the ready agitation and distribution of the fertilizer at such times as may be required, and in sufficient quantities, by means of a gaged slide; and it consists in the detailed construction, combination, and arrangement of the parts, substantially as hereinafter fully set forth, and particularly pointed out in the claims.

In the accompanying drawings, Figure 1 is a plan view of my invention. Fig. 2 is a side elevation thereof, and Figs. 3 and 4 are detail views.

In carrying out my invention I employ a preferably rectangular vehicle, A, which on either side, at about its center, is provided with two oppositely-disposed plates or clamping-bars, $a$ $a$, secured thereto by ordinary means. At their lower ends these plates or clamping-bars are rigidly secured in like manner to the inner ends of two shafts or thills, $a'$ $a'$, the other ends of which are projected sufficiently forward from the front end of the vehicle for suitable draft attachment. These plates or clamping-bars are each provided with semicircular notches or recesses for passage therethrough of the vehicle-axle.

B is the vehicle-axle, upon the outer narrowed ends of which are loosely secured the wheels B' B'. The axle is notched or recessed at the points of passage through the recesses formed in the plates or clamping-bars for the more secure retention of the same in position. To one end of the axle, at a point about central between the clamping bars and the vehicle-wheel, is rigidly secured an eye or staple, $b$, through which is passed one end of a bail or link, C, the other similar-shaped end of which has passed therethrough an approximately oblong-shaped link, C', the purpose of which will soon appear.

D is a circular agitator or distributing wheel rigidly secured upon the axle B, at about the center thereof, and designed to revolve with said axle in connection with the carrying-wheels, the same being effected by the insertion or passage of the bail or link C between any two of the spokes of the adjoining carrying-wheels B' and insertion of the link C' over the narrowed end of the axle.

The vehicle is provided with two oppositely-disposed slanting plates or partitions, E, terminating at their lower ends in an apertured hopper, $e$, the opposite ends having a portion of their surface removed, as at $e'$ $e^2$, for the passage therethrough of the agitator or distributing wheel D, and to permit of the dropping or distribution of the fertilizer contained in the vehicle.

To the under side of the forward inclined slanting plate or partition E is secured by means of flanged plates or guides $f$ a slide, F, which is gaged on its upper surface to regulate the amount of distribution of the fertilizer, the lower inner end of said slide being extended along the under side of the opening or aperture $e^2$ formed in said plate or partition. This slide may be secured at the desired point of adjustment by an ordinary set-screw, $f'$, passed through a screw-threaded opening or aperture formed near the upper end of the forward plate or partition, or by any other suitable means. The lower inner end of this plate or partition is securely braced or held in position by means of a horizontal cross-bar, $f$, secured at each end to the sides of the shafts or thills of the vehicle.

A hook, G, is rigidly secured to that side of the vehicle on which the link or bail C is placed, and is designed to secure the free end of the link C' when not placed on the end of the vehicle axle, as before described.

From the foregoing it will be seen that upon the starting of the vehicle, the same being filled with fertilizing material, the link or bail being passed between any two spokes of the vehicle-wheel and secured to the axle, the axle will be caused to revolve with the said wheels, causing the revolution of the agitator or distributing wheel, and the consequent distribution of the fertilizer through the openings formed in the hopper $e$.

My invention is simple, cheap, and durable, being free from all complication, and is not liable to get out of order.

Having thus fully described my invention, what I claim, and desire to secure by Letters Patent, is—

1. The herein described fertilizer-distributer, comprising the vehicle having clamping-bars depending therefrom, the axle having the wheels secured thereon, the links or bails secured to said axle for the purpose stated, the agitator-wheel, and the inclined plates having the apertured hopper, substantially as shown and described.

2. The combination, with the vehicle, the axle, and carrying-wheels, of the link or bail secured to said axle and the oblong link connected to one end thereof, substantially as shown, and for the purpose specified.

In testimony whereof I affix my signature in presence of two witnesses.

JOHN A. MAXWELL.

Witnesses:
R. A. McTYER, Jr.,
C. W. WIMBERLEY.